(No Model.)

J. G. KOENEN.
EYEGLASS CASE.

No. 575,357. Patented Jan. 19, 1897.

WITNESSES:
Gustave Dieterich
John Rehmbeck

INVENTOR
John G. Koenen
BY H. A. West
ATTORNEY.

UNITED STATES PATENT OFFICE.

JOHN G. KOENEN, OF MOUNT VERNON, NEW YORK.

EYEGLASS-CASE.

SPECIFICATION forming part of Letters Patent No. 575,357, dated January 19, 1897.

Application filed May 6, 1896. Serial No. 590,500. (No model.)

*To all whom it may concern:*

Be it known that I, JOHN G. KOENEN, a citizen of the United States, and a resident of Mount Vernon, in the county of Westchester and State of New York, have invented certain new and useful Improvements in Eyeglass-Cases, of which the following is a specification.

My invention relates to eyeglass-cases consisting of two members hinged together, shaped to inclose eyeglasses; and the invention consists in centrally recessing one of the hinged members in such a manner that deflected portions of the cover embrace the nose-pieces or guards of the inclosed glasses when the case is closed and operate not only to hold the glasses securely in place in the case, but also to center the glasses in the case and pinch the guards together by the act of closing the case.

Figure 1:
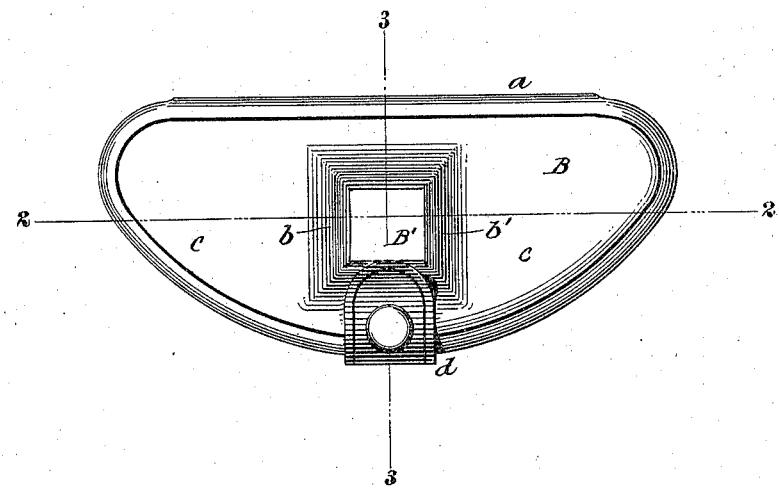
Figure 2:
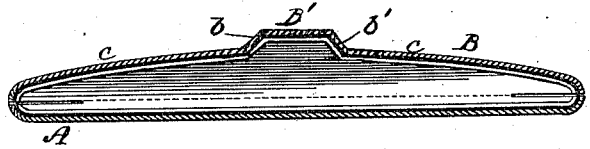
Figure 3:
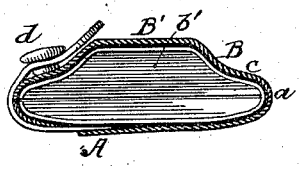

In the accompanying drawings, to which reference is made, and which form a part of this specification, Figure 1 is a plan view of my new and improved eyeglass-case; Fig. 2, a longitudinal sectional elevation of the same on line 2 2 of Fig. 1, and Fig. 3 is a transverse sectional elevation on line 3 3 of Fig. 1.

A represents the base or supporting member of the case, and B represents the cover. The said cover is formed at or near its center with converging cam-surfaces, the same being produced by a recess or dome B', the top of which is on a higher level than the main body of the cover, and the sides $b\ b'$ of which are made sloping, so that the said recess is in the form of a hollow truncated cone or pyramid rising from the more shallow surrounding surface $c\ c$, as shown. The two members A B may be of metal, pasteboard, or other suitable material, and are by preference covered on the outside with leather, leatherette, or other suitable material, and lined with felt or other fabric, and they are secured together, edge to edge, by a back hinge $a$, and provided with a suitable clasp or fastening device $d$ for holding the case closed.

In use the eyeglasses are simply placed in the case without any special care and the two members pressed together, whereupon the walls of the recess act upon the nose-pieces or guards and automatically register the glasses in the case and hold them securely in place without the exercise of any special care in placing the glasses in the case. Furthermore, the inclined walls $b\ b'$ of the recess operate to close the nose-pieces or guards, that is, to press them toward each other, and thus maintain a closing-tension on the arch-spring which unites the lenses, which is effective in maintaining the normal strength of the said spring.

Having thus described my invention, what I claim as new, and desire to secure by Letters Patent, is—

As an article of manufacture an eyeglass-case comprising a concaved base-section A, and a convex cover B hinged at one edge to the base-section, said cover B being formed at the center with interior converging cam-surfaces $b,\ b'$ to act on the eyeglass-guards for registering the glasses in the case and pinching the guards together in the act of closing the case, substantially as described.

JOHN G. KOENEN.

Witnesses:
 H. A. WEST,
 CHARLES J. BRECK.